United States Patent
Kawada et al.

(10) Patent No.: US 6,712,370 B2
(45) Date of Patent: Mar. 30, 2004

(54) STRUT MOUNT

(75) Inventors: Michihiro Kawada, Osaka (JP); Hideo Tadano, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/129,706

(22) PCT Filed: Jul. 26, 2001

(86) PCT No.: PCT/JP01/06473
§ 371 (c)(1),
(2), (4) Date: May 9, 2002

(87) PCT Pub. No.: WO02/32701
PCT Pub. Date: Apr. 25, 2002

(65) Prior Publication Data
US 2002/0163155 A1 Nov. 7, 2002

(30) Foreign Application Priority Data
Oct. 11, 2000 (JP) ......................................... 2000-310055

(51) Int. Cl.[7] ........................... B60G 15/00; F16B 37/04
(52) U.S. Cl. ................................. 280/124.155; 411/180; 411/183
(58) Field of Search ................................. 411/180, 183; 280/124.155

(56) References Cited

U.S. PATENT DOCUMENTS

| | | | | | |
|---|---|---|---|---|---|
| 1,705,463 | A | * | 3/1929 | Andren | 411/180 |
| 1,759,339 | A | * | 5/1930 | Andren | 411/180 |
| 2,138,409 | A | * | 11/1938 | Salter | 411/183 |
| 2,649,884 | A | * | 8/1953 | Westover | 411/173 |
| 2,722,259 | A | * | 11/1955 | Eckenbeck et al. | 411/180 |
| 3,736,969 | A | * | 6/1973 | Warn et al. | 411/179 |
| 3,809,139 | A | * | 5/1974 | Strain | 411/183 |
| 3,845,860 | A | * | 11/1974 | Ladouceur et al. | 206/338 |
| 3,878,598 | A | * | 4/1975 | Steward | 29/432.2 |
| 4,425,065 | A | * | 1/1984 | Sweeney | 411/23 |
| 5,024,461 | A | | 6/1991 | Miyakawa et al. | |
| 5,040,775 | A | | 8/1991 | Miyakawa | |
| 5,064,176 | A | | 11/1991 | Goto | |
| 5,088,704 | A | | 2/1992 | Kanda | |
| 5,263,694 | A | * | 11/1993 | Smith et al. | 267/220 |

* cited by examiner

Primary Examiner—Charles T. Jordan
Assistant Examiner—Bret Hayes
(74) Attorney, Agent, or Firm—Wenderoth, Lind & Ponack, L.L.P.

(57) ABSTRACT

The present invention provides a strut mount bolted to a curved outer cylinder attachment plate (6) without enlarging abolt hole, by inserting a cylindrical portion (13) of a caulking nut (5) into a nut attachment hole (11) of an attachment piece (10) of an outer cylinder (2) and pressurizing and diminishing in diameter the circumference of the nut attachment hole (11) to caulk and stick the nut attachment hole (11) and the caulking nut (5).

4 Claims, 3 Drawing Sheets

STRUT MOUNT

FIELD OF THE INVENTION

This invention relates to a strut mount disposed at an attachment portion of a buffer to a vehicle.

DESCRIPTION OF THE RELATED ART

In general, in a suspension system of an automobile, etc., a so-called strut mount is disposed at an attachment portion of a buffer to a vehicle body, in order to control vibration, etc. propagated from wheels to the vehicle body.

FIG. 6 shows an example of the strut mount. The strut mount comprises an inner cylinder 101 in which a piston rod of the buffer is fixed, an outer cylinder 102 attached to the vehicle body, and a rubber elastomer 103 interposed between the inner and outer cylinders to dampen input vibration, and a bolt 106 inserted into a bolt hole 105 thereof from below is press fitted and secured to an attachment piece 104 of the outer cylinder 102. With the bolt 106 lifted up so as to insert into a bolt hole 108 of the vehicle body's outer cylinder attachment plate 107 from below and a nut tightened from above the outer cylinder attachment plate 107, the strut mount will be attached to the vehicle body only by attachment working from above.

In order to raise rigidity and improve running properties, the strut mount shown in FIG. 6 is constructed so that the attachment piece 104 of the outer cylinder 102 and the outer cylinder attachment plate 107 of the vehicle body are curved in the form of a sphere, and that each bolt 106 press fitted and secured to the attachment piece 104 is oriented toward the inclined direction, respectively, against the direction of movement (perpendicular) when the strut mount is lifted up. For that purpose, the bolt hole 108 on the outer cylinder attachment plate 107 is made larger so that the bolt 106 oriented toward the inclined direction can be inserted.

However, when the bolt hole is large, it is apprehended that there occur problems related to bolt tightening such as looseness. Therefore, a means of inserting the bolt, without making the bolt hole larger, and tightening the bolt only by operations from above is pursued.

DISCLOSURE OF THE INVENTION

The present invention has been made in view of the subjects described above, and it is an object of the invention to provide a strut mount intended to insert a bolt, without making the bolt larger, and tighten an attachment piece of an outer cylinder at the underside of a vehicle body's outer cylinder attachment plate, with a bolt, only by operations from above, by providing a nut at the underside of the outer cylinder attachment piece and screwing the bolt into the nut from upside the outer cylinder attachment plate of a vehicle body.

When providing the nut for the attachment piece of the outer cylinder, a technique that a small hole is drilled at the prescribed position on the attachment piece of the outer cylinder, a burr is formed (burring working) downwardly around the circumferential edge of the hole as a cylindrical portion, and an inner circumferential surface of the cylindrical portion is tapped and cut as screw threads to serve as a nut, also comes to mind. However, such technique makes its working difficult and complicated. Furthermore, in order to elongate the nut of a given diameter and cut the required number of screw threads, it is necessary to thicken the outer cylinder, with the result that the weight of the components grows heavier.

Otherwise, as for the method of welding a nut on the underside of the attachment piece of the outer cylinder, in order to avoid deterioration of rubber elastomer due to welding heat, it is necessary to weld the nut before working the strut mount or to escape welding heat by masking around the nut of the attachment piece, whereby making the strut mount working difficult and complicated.

Accordingly, the present invention adopts a nut securing means of making the thickness of the outer cylinder thinner to lightweight the components, without causing difficult and complicated working, and capable of maintaining the durability of rubber elastomer, by caulking and securing the nut on the underside of the attachment piece of the outer cylinder.

When caulking and securing the nut to the attachment piece of the outer cylinder, either upsetting on the nut side or diminishing in diameter the nut attachment hole of the outer cylinder can be adopted.

In case of upsetting on the nut side, the nut attachment hole is drilled on the attachment piece of the outer cylinder, on the other hand, a cylindrical portion is provided continuously from the nut portion for the caulking nut: the cylindrical portion is inserted into the nut attachment hole from the underside of the attachment piece of the outer cylinder; after that, when the cylindrical portion is upset and caulked and secured to the nut attachment hole, an outer circumferential surface of the cylindrical portion is stuck fast to an inner circumferential surface of the nut attachment hole, thus sticking the nut on the underside of the attachment piece of the outer cylinder.

In case where the nut attachment hole is diminished in diameter, with the cylindrical portion of the caulking nut inserted into the nut attachment hole from the underside, by pressurizing the circumference of the nut attachment hole from the direction square to the plate surface of the attachment piece of the outer cylinder, the inner circumferential surface of the nut attachment hole is stuck fast to the outer circumferential surface of the cylindrical portion to caulk and stick the nut on the underside of the attachment piece of the outer cylinder.

At this time, provided that the outer circumferential surface of the cylindrical portion of the caulking nut is corrugated, an extra wall surrounding the nut attachment hole cuts into the corrugated outer circumferential surface of the cylindrical portion as the nut attachment hole is diminished in diameter, the extra wall acts as a steady rest to restrain the caulking nut from turning together with the bolt.

When the attachment piece of the outer cylinder and the outer cylinder attachment plate of a vehicle body are curved in the form of a spherical surface, the aforementioned means may appropriately be used for a strut mount. Where the form of a spherical surface denotes a curved surface constituting a part of a sphere.

BEST MODE FOR CARRYING OUT THE INVENTION

Figure 1:
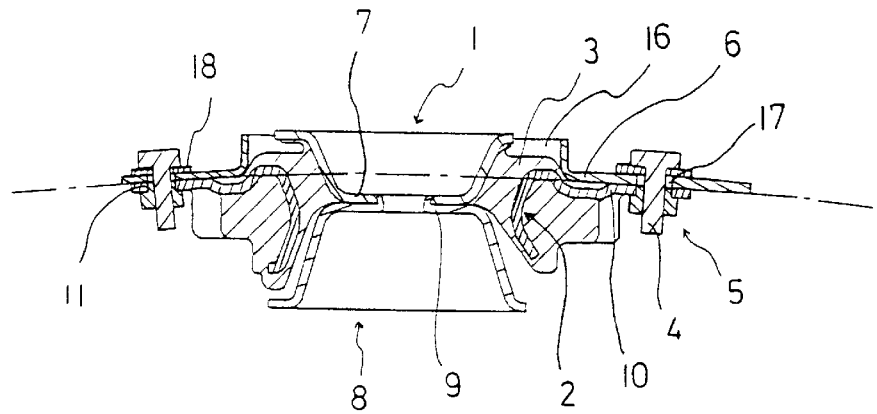
FIG. 1 is a sectional view of a strut mount of the present invention.
Figure 2:
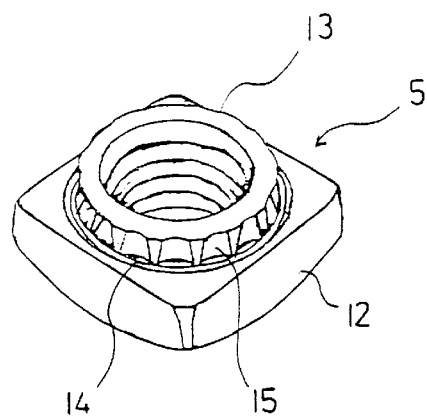
FIG. 2 is a perspective view of a caulking nut of the invention showing a cylindrical portion being diminished in diameter.
Figure 3:
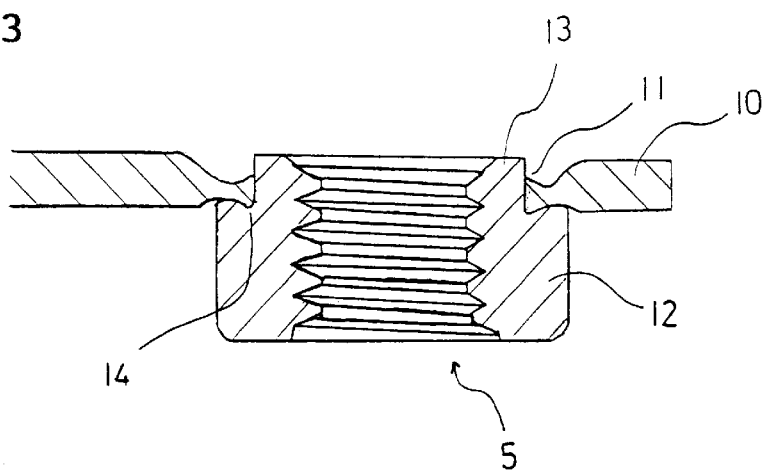
FIG. 3 is a sectional view showing the state of attachment of the caulking nut of FIG.2.

Best mode for carrying out the strut mount of the present invention will be hereinafter described with reference to the drawings. FIG. 1 is a sectional view of the strut mount of the invention. FIG. 2 is a perspective view of the caulking nut used for the present embodiment of the invention. FIG. 3 is a sectional view of the caulking nut stuck to the nut attachment hole of the outer cylinder attachment piece.

The strut mount comprises an inner cylinder 1 to which a piston rod of a buffer is fixed, an outer cylinder 2 attached to the vehicle body side, a rubber elastomer 3 in the form of a ring interposed between the inner and outer cylinders 1, 2 to dampen input vibration, the outer cylinder 2 being fastened on the outer cylinder attachment plate 6 curved in the form of upwardly convex sphere on the vehicle body side by the bolt 4 and the caulking nut 5.

The inner cylinder 1 is a tubular steel product disposed on the inside of the rubber elastomer 3, and at its lower extremity an inwardly annular flange 7 is formed in the direction square to the axial direction. Inside of the inner cylinder 1 there is space for fixing the piston rod that inserts through inside the flange 7 from the underside by a nut, etc. The inner circumferential surface of the rubber elastomer 3 is vulcanization adhered to the outer circumferential surface of the inner cylinder 1. A steel tubular bound bumper seat 8 is disposed on the underside of the inner cylinder 1, at the upper extremity thereof an annular flange 9 formed inwardly is stacked on the flange 7 of the inner cylinder 1, where by the inner cylinder 1 is integral with the bound bumper seat 8.

The outer cylinder 2 is a tubular steel product disposed nearly concentrically with the inner cylinder 1 so as to cover the inner cylinder 1 from outside and embedded in the rubber elastomer 3. At the upper extremity of the outer cylinder 3, a curved annular attachment piece 10 is formed so as to be outwardly in the direction square to the axial direction and become higher on the inside. The attachment piece 10 is tightened on the underside of the outer cylinder attachment plate 6 of the vehicle body by the bolt. The portion of the attachment piece 10 to be tightened by the bolt, where a nut attachment hole 11 is drilled, is projected outside of the rubber elastomer 3. A caulking nut 5 is stuck to the nut attachment hole 11.

The caulking nut 5 comprises a nut portion 12 disposed on the underside of the attachment piece 10 and a cylindrical portion 13 inserted into the nut attachment hole 11 from the underside. On the inner circumferential surface of the nut portion 12 and the cylindrical portion 13, screw threads are cut continuously, wherein the bolt 4 is screwed. The caulking nut 5 is stuck to the nut attachment hole 11, the circumference of which, on the attachment piece 10, is pressurized and caulked, which is then diminished in diameter. For the purpose of making harder than the attachment piece 10, the caulking nut 5 is a hardened steel product.

Having larger diameter than the nut attachment hole 11, the nut portion 12 gets caught in the circumferential edge of the nut attachment hole 11 so as not to slip through and come out the attachment piece 10 upwardly. A groove 14 is made around the cylindrical portion 13 above the nut portion 12, so extra wall of the attachment piece 10 cuts into there when pressurizing the circumference of the nut attachment hole 11.

The cylindrical portion 13 has an outside diameter enough to be inserted into the nut attachment hole 11, and its outer circumferential surface is corrugated so that the extra wall of the attachment piece 10 cuts into the cylindrical portion 13 when pressurizing the circumference of the nut attachment hole 11. The closer to the base extremity side (lower side) the cylindrical portion 13 reaches, the deeper the corrugation 15 on the outer circumferential surface is formed. The extra wall being cut into is intended to restrain the caulking nut 5 from slipping through downward.

Next, the procedure of attaching the strut mount to the outer cylindrical attachment plate 6 of a vehicle body is described below. First, the cylindrical portion 13 of the caulking nut 5 is inserted from below into the nut attachment hole 11 of the strut mount assembled, and then the circumference of the nut attachment hole 11 of the attachment piece 10 is pressurized and caulked from above.

At this time, the nut attachment hole 11 is diminished in diameter, and the inner circumferential surface thereof is stuck fast to the cylindrical portion 13. Further, the extra wall of the attachment piece 10 cuts into the corrugation 15 on the outer circumferential surface of the cylindrical portion 13, whereby forming a steady rest that restrains the bolt 4 from turning together with the caulking nut 5, with the result to secure predetermined turning torque. Being made of hardened steel, the caulking nut 5 will not be deformed.

With the strut mount lifted up so that the inner cylinder 1 passes through an opening 16 of the outer cylinder attachment plate 6 of the vehicle body, and also with the underside of the bolt hole 17 on the outer cylinder attachment plate 6 of the vehicle body aligned with the bolt hole of the caulking nut 5, the bolt 4 inserted vertically into the plate surface from above the outer cylinder attachment plate 6 through a washer 18 is screwed into the caulking nut 5 and the attachment piece 10 of the outer cylinder 2 is bolted to the outer cylinder attachment plate 6 of the vehicle body, then attachment of the strut mount is completed.

According to the configuration described above, since the bolt 4 can be inserted perpendicularly to the plate surface even when the outer cylinder attachment plate 6 of the vehicle body is curved, it is not necessary to make the bolt hole 17 of the outer cylinder attachment plate 6 larger, and problems such as looseness can be dissolved. Further, since the attachment piece 10 is caulked to stick the caulking nut 5, it is not necessary to thicken the attachment piece 10 of the outer cylinder 2 just like in the case of burring working, so that the weight of the components can be reduced. Besides, because the nut is not welded, post working can easily be performed even after vulcanization forming of the rubber, laborsaving during operations.

Figure 4:
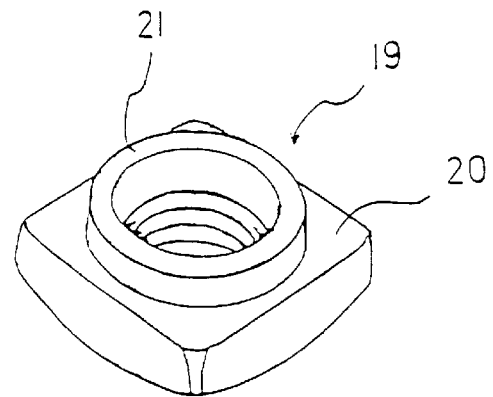
FIG. 4 is a perspective view of a caulking nut showing another embodiment.
Figure 5:
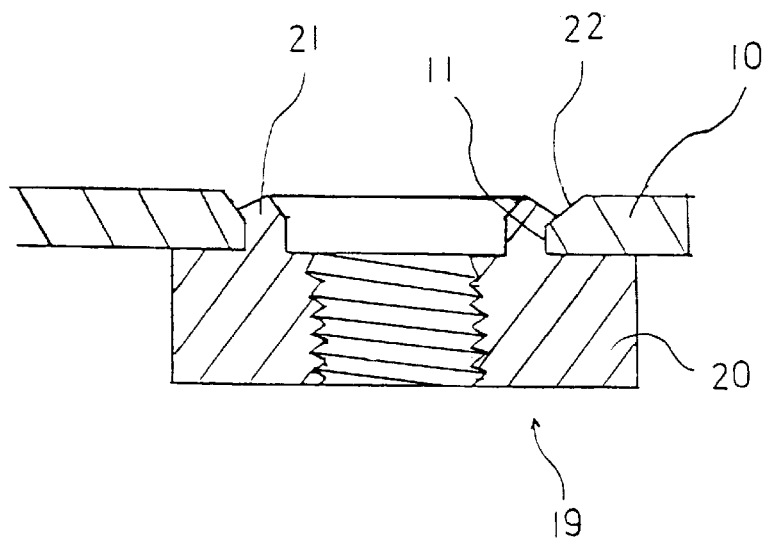
FIG. 5 is a sectional view showing the state of attachment of the caulking nut of FIG.4.
Figure 6:
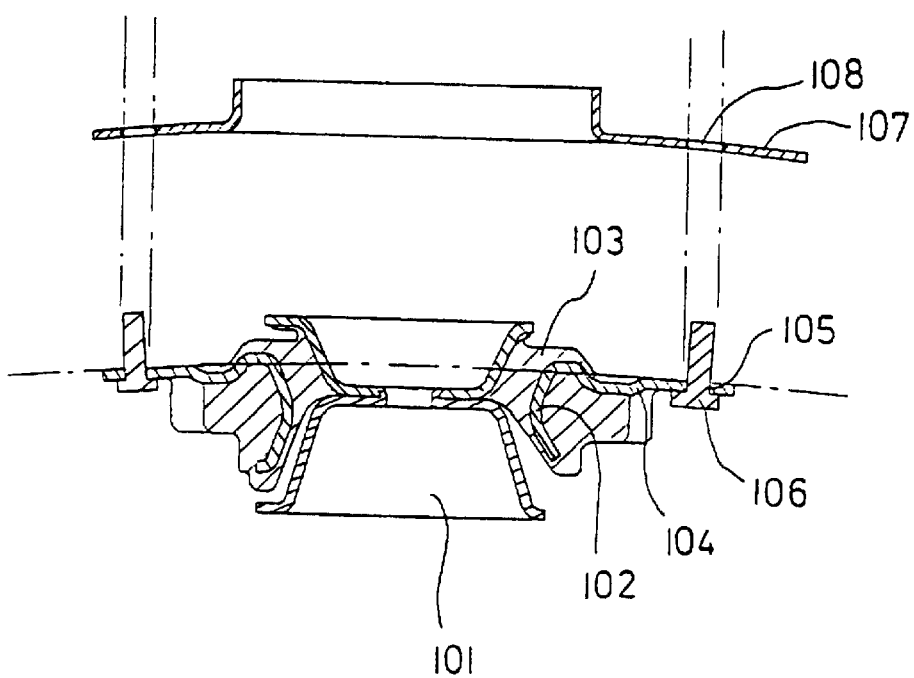
FIG. 6 is a sectional view of conventional strut mount.

FIGS. 4 and 5 show other embodiments of the caulking nut. FIG. 4 is a perspective view of the caulking nut when upsetting the cylindrical portion. FIG. 5 is a sectional view of the caulking nut stuck to the nut attachment hole by upsetting the cylindrical portion.

The caulking nut 19 comprises a nut portion 20 disposed on the underside of the attachment piece 10 and a cylindrical portion 21 that is inserted into the nut attachment hole 11 from the underside. The caulking nut 19 is caulked and secured to the nut attachment hole 11 by pressurizing and upsetting the cylindrical portion 21 outwardly. For the purpose of making harder than the attachment piece 10, the caulking nut 19 is a hardened steel product.

Having larger diameter than the nut attachment hole 11, the nut portion 20 gets caught in the circumferential edge of the nut attachment hole 11 so as not to slip through and come out of the attachment piece 10 upwardly. On the inner circumferential surface of the nut portion 20, screw threads are cut, wherein the bolt 4 is screwed.

The cylindrical portion 21 has an outside diameter enough to be inserted into the nut attachment hole 11, and its inside diameter is larger than that of the nut portion 20 so as not to deform the screw threads of the nut portion 20 when being caulked. Having a chamfering 22 on the above side of the circumferential edge of the nut attachmen thole 11, the upsetting upper extremity of the cylindrical portion 21 is gotten caught so as not to slip through and come out of the caulking nut 19 downwardly.

In the configuration described above, when attaching the caulking nut 19 to the attachment piece 10, the nut attachment hole 11 is drilled on the attachment piece 10 of the outer cylinder, the cylindrical portion 21 integral with the nut portion 20 is provided for the caulking nut 19, and then the cylindrical portion 21 is inserted into the nut attachment hole 11 from the underside of the outer cylinder attachment piece 10. After that, when the cylindrical portion 21 is upset and then is caulked and secured to the nut attachment hole 11, the outer circumferential surface of the cylindrical portion 21 is stuck fast to the inner circumferential surface of the nut attachment hole 11, whereby the, nut 19 can be stuck to the underside of the outer cylinder attachment piece 10.

Industrial Applicability

According to the present invention, it will be obvious from the description above that rigidity can be raised to improve running properties, because the outer cylinder attachment plate can be curved by the use of the caulking nut stuck to the underside of the attachment piece of the outer cylinder, without enlarging the bolt hole of the outer cylinder attachment plate of the vehicle body.

Furthermore, cost reduction can be accomplished by thinning the plate thickness to lightweight the products and also labor saving during operations. Accordingly, it is an object of the invention to provide an optimum strut mount as a suspension system for automobile and the like.

What is claimed is:

1. A mounting assembly for attaching a strut to an outer cylinder attachment plate of a vehicle body, said mounting assembly comprising:

an outer cylinder including an attachment piece having a hole provided therein;

a caulking nut comprising a cylindrical portion, a nut portion and a bolt hole disposed through said cylindrical portion and said nut portion; and a bolt extending through said hole and said bolt hole such that a head of said bolt is disposed adjacent to the outer cylinder attachment plate, wherein said cylindrical portion has a plurality of corrugations thereon, wherein said cylindrical portion is disposed in the hole such that material of said outer cylinder occupies said plurality of corrugations thereby inhibiting a rotational movement of said caulking nut.

2. The mounting assembly as set forth in claim 1, wherein said attachment piece of said outer cylinder is curved in the form of a spherical surface to facilitate attachment to an outer cylinder attachment plate that is curved in the form of a spherical surface.

3. The mounting assembly as set forth in claim 1, wherein said caulking nut is operable to be caulked and secured to said attachment piece of said outer cylinder by pressurizing the circumference of the hole of said attachment piece from a direction normal to said attachment piece to decrease the diameter of the hole.

4. The mounting assembly as set forth in claim 3, wherein said attachment piece of said outer cylinder is curved in the form of a spherical surface to facilitate attachment to an outer cylinder attachment plate that is curved in the form of a spherical surface.

* * * * *